US011426669B2

(12) United States Patent
Kwan

(10) Patent No.: US 11,426,669 B2
(45) Date of Patent: Aug. 30, 2022

(54) METHOD OF MANUFACTURING A MODEL CAR BODY

(71) Applicants: GATEWAY AUTOART LIMITED, Tsuen Wan (CN); GATEWAY AUTOART JAPAN CORPORATION, Fuefuki (JP)

(72) Inventor: Kelvin Yuet-Ming Kwan, Hong Kong (HK)

(73) Assignees: GATEWAY AUTOART LIMITED, Tsuen Wan (CN); GATEWAY AUTOART JAPAN CORPORATION, Fuefuki (JP)

( * ) Notice: Subject to any disclaimer, the term of this patent is extended or adjusted under 35 U.S.C. 154(b) by 556 days.

(21) Appl. No.: 16/242,252

(22) Filed: Jan. 8, 2019

(65) Prior Publication Data
US 2019/0336873 A1 Nov. 7, 2019

(30) Foreign Application Priority Data
May 7, 2018 (CN) .......................... 201810425902.8

(51) Int. Cl.
*A63H 17/00* (2006.01)
*B29C 45/26* (2006.01)
*B29C 45/37* (2006.01)

(52) U.S. Cl.
CPC ....... *A63H 17/002* (2013.01); *B29C 45/2602* (2013.01); *B29C 45/37* (2013.01)

(58) Field of Classification Search
CPC .......... B29C 2045/14319; B29C 45/14; B29C 45/14311; B29C 33/302; B29C 33/48;
(Continued)

(56) References Cited

U.S. PATENT DOCUMENTS 4,188,748 A * 2/1980 Rich ...................... A63H 17/44
446/430
6,435,366 B1 8/2002 Johnson et al.
(Continued)

FOREIGN PATENT DOCUMENTS

CN 205627064 U 10/2016
CN 206734192 U 10/2017
(Continued)

OTHER PUBLICATIONS

Official Action dated Aug. 15, 2019, by the Japanese Patent Office in counterpart Japanese Patent Application 2018-158960.
(Continued)

*Primary Examiner* — Yunju Kim
(74) *Attorney, Agent, or Firm* — Ladas & Parry LLP

(57) ABSTRACT

The present disclosure relates to a method of manufacturing a model car body, including preparing a steel mold comprising a core plate with an inner core, a top plate and at least two side plates; attaching at least one pre-fabricated plastic block to a side of the inner core of the core plate; combining the core plate, the top plate and the at least two side plates with each other, wherein a cavity is formed among the top plate, the side plates, the inner core of the core plate and the at least one pre-fabricated plastic block; injecting melted plastic material into the cavity, wherein the melted plastic material is filled with the cavity and the at least one pre-fabricated plastic block is encased by the melted plastic material; solidifying the melted plastic so as to form the model car body, wherein the at least one pre-fabricated plastic block is integrated with the plastic model car body; separating the core plate, the top plate and the at least two side plates from each other; and releasing the model car body with the at least one pre-fabricated plastic block from the mold.

5 Claims, 4 Drawing Sheets

(58) Field of Classification Search
CPC ..... B29C 33/76; B29C 45/2602; B29C 45/37; B29C 45/64; B29C 45/40; B29C 45/44; B29C 2045/445; B29C 45/4421; B29C 45/26
USPC ...................................................... 264/328.1
See application file for complete search history.

(56) References Cited

U.S. PATENT DOCUMENTS

| | | | |
|---|---|---|---|
| 2012/0171317 A1* | 7/2012 | Tsai | B29C 45/14 425/116 |
| 2017/0080605 A1* | 3/2017 | Sugihara | B29C 33/48 |

FOREIGN PATENT DOCUMENTS

| | | |
|---|---|---|
| CN | 107263796 A | 12/2017 |
| EP | 0826476 A1 | 4/1998 |
| JP | S62164504 A | 7/1987 |
| WO | 2015072472 A1 | 3/2015 |

OTHER PUBLICATIONS

English translation of the above.
Official Action dated Nov. 26, 2020 by CNIPA (China National Intellectual Property Administration) in Applicant's counterpart Chinese application CN Patent Application No. 201810425902.8.
English translation of the Search Report of CN30936.
English Abstract of CN206734192 U.
English Abstract of CN107263796 A.
Machine English translation of CN205627064U.
Machine English translation of JPS62164504A.
European Search Report issued in foreign counterpart patent application No. 19151422.3.
Australian Examination Report dated Jun. 5, 2019 issue in counterpart Australian Patent Application No. 2018205081.
English translation of the abstract of WO2015027472A1.

* cited by examiner

METHOD OF MANUFACTURING A MODEL CAR BODY

BACKGROUND

1. Field of the Invention

The disclosed invention relates to a method for manufacturing a model car body and the model car body manufactured thereby.

2. Description of Related Art

Conventionally, a car type model (a minicar) is broadly popular as a toy for children or as ornaments aesthetically enjoyed by adults. For this reason, there is a demand to finely fabricate a minicar in order to imitate an authentic car as close as possible. Therefore, there are minicars offered for ornamental purposes which capture authentic cars inside and out.

Generally, a plastic model car body is manufactured by molding. The steel mold used for molding the plastic model car body comprises a core plate with an inner core, a top plate and two side plates. While manufacturing the plastic, the core plate, the top plate and two side plates are combined with each other such that the steel mold is closed and a cavity is formed in the steel mold, and then melted plastic is injected into the cavity of the mold. After the melted plastic is filled with the cavity of the mold, the melted plastic will be solidified so as to form a plastic model car body. After the melted plastic has been solidified and the plastic model car body has been hardened into shape, the mold is opened and the plastic model cat body is released from the core plate of the mold.

The model car body is usually widest on its waistline and tapered towards upper and lower sides. If the body waistline of the inner core of the core plate is much larger than the lower part of the inner core of the core plate, the injected plastic model car body cannot be released easily from the inner core of the core plate. Thus, the plastic model car body should be configured to have a draft angle at its interior such that the plastic model car body could be easily released from the inner core of the core plate after it has been hardened into shape. Likewise, the inner core of the core plate should be tapered accordingly.

When the plastic model car comprises openable doors, the plastic model car body should have the frames around the door openings respectively and each frame should be thicker than the plastic model car body panel so as to accommodate the door. Commonly, the plastic model car body and the thicker frames will be manufactured together by molding and the plastic model car body with the thicker frames should be configured to have a draft angle. However, the plastic will shrink during the solidification of the melted plastic after injection and the thicker the plastic part, the higher the shrinkage. If the plastic model car should have a smooth outer surface but its inner surface is configured to have an uneven thickness on various parts in order to create the draft angle at the interior of the plastic model car body, the different rate of shrinkage of the solidification of the melted plastic will cause the outer surface of the plastic model car body to be uneven.

SUMMARY OF THE INVENTION

A high-price collectable plastic model car body must be perfectly smooth on the outer surface, because of this, the wall thickness of the plastic model car body, especially the side panel, must be kept minimal in order to avoid any shrinkage. If the wall needs to be thicker for the easy release of the body from the inner core, a separate piece of plastic block will be attached to create the necessary thickness. The attachment of the plastic block is performed by a method named as "insert-molding". Insert-molding is a common method used in the plastic manufacturing industry but unique in plastic model car manufacturing.

According to one exemplary embodiment of the disclosed invention, a method for manufacturing a model car body comprises: preparing a steel mold comprising a core plate with an inner core and a top plate and two side plates; attaching at least one pre-fabricated plastic block to a side of the inner core of the core plate; combining the core plate, the top plate and the side plates with each other, wherein a cavity is formed among the top plate, the side plates, the inner core of the core plate and the at least one pre-fabricated plastic block; injecting melted plastic material into the cavity, wherein the melted plastic material is filled with the cavity and the at least one pre-fabricated plastic block is encased by the melted plastic material; solidifying the melted plastic so as to form the model car body, wherein the at least one pre-fabricated plastic block is integrated with the plastic model car body; separating the core plate, the top plate and the side plates from each other; and releasing the model car body with the at least one pre-fabricated plastic block from the mold.

According to another exemplary embodiment of the disclosed invention, a plastic model car body comprises at least one plastic block integrated with an inner surface of the body, wherein a total thickness of the at least one plastic block and a portion of the body corresponding to the at least one plastic block is larger than a wall thickness of another portion of the body.

In order to further understand the disclosed invention, the following embodiments are provided along with illustrations to facilitate the appreciation thereof; however, the appended drawings are merely provided for reference and illustration, without any intention to be used for limiting the scope of the invention.

DETAILED DESCRIPTION OF THE PREFERRED EMBODIMENTS

The aforementioned illustrations and following detailed descriptions are exemplary for the purpose of further explaining the scope of the invention. Other objectives and advantages related to the invention will be illustrated in the subsequent descriptions and appended drawings.

Figure 1:
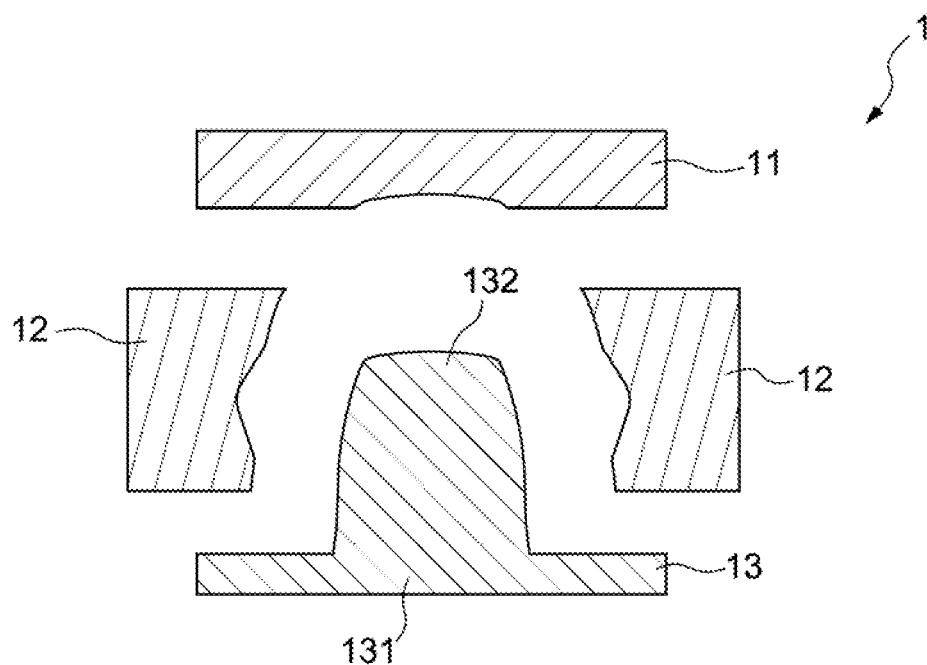
FIG. 1 is a schematic view showing a steel mold for manufacturing a plastic model car body in accordance with an embodiment of the disclosed invention.

FIG. 1 shows a steel mold 1 used for manufacturing a plastic model car body. The steel mold 1 comprises a top plate 11, at least two side plates 12 and a core plate 13, wherein the core plate 13 comprises a base 131, and an inner core 132 arranged above the base 131 and the inner core 132 is tapered from its bottom to its top. The top plate 11 and the at least two side plates 12 are movable and the core plate 13 is fixed. The top plate 11 and the at least two side plates 12 could be moved to be adjacent to the core plate 13 such that they are combined with each other.

Figure 2A:
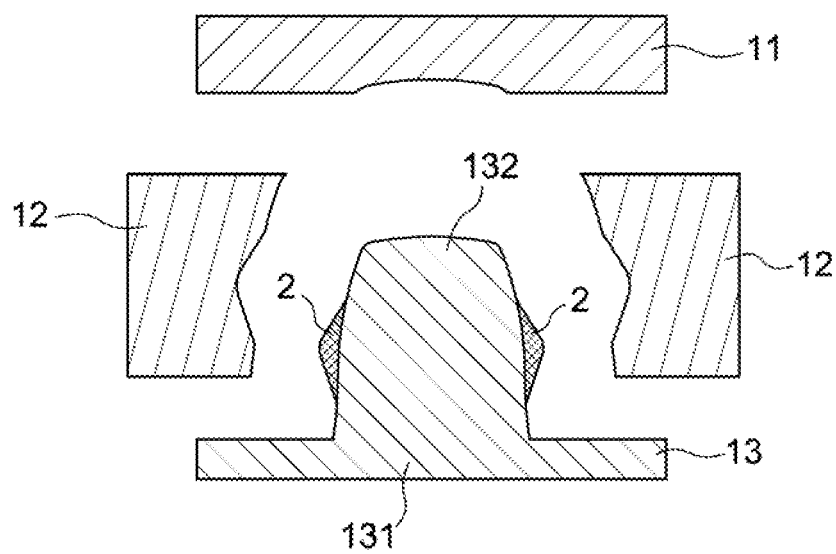
FIGS. 2A-2E are schematic views showing a manufacturing process of one embodiment of a plastic model car body in accordance with an embodiment of the disclosed invention.

FIGS. 2A-2E shows a manufacturing process of one embodiment of a plastic model car body in accordance with an embodiment of the disclosed invention. Firstly, referring to FIG. 2A, at least one pre-fabricated small plastic block 2 is attached to the inner core 132 of the core plate 13, wherein the at least one pre-fabricated small plastic block 2 is positioned to correspond to the portion of the plastic model car body where the required wall thickness will be formed, such as the frame of the door opening of the plastic model car body. As shown in FIG. 2A, two pre-fabricated small plastic blocks 2 are attached to two sides of the inner core 132 of the core plate 13, respectively.

Figure 2B:
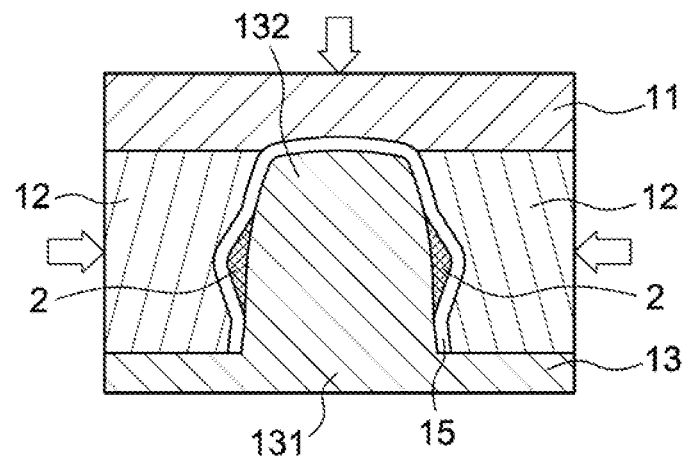

After attaching the pre-fabricated small plastic blocks 2 to the inner core 132 of the core plate 13, as shown in FIG. 2B, the top plate 11 and side plates 12 respectively move in the direction of the arrows such that the top plate 11, the side plates 12 and the core plate 13 are combined with each other and the mold 1 is closed. When the mold 1 is closed, there is a cavity 15 formed within the mold. The cavity 15 is formed as thin as possible, and the thickness of the cavity 15 is configured to be substantially constant. In other words, in the closed mold 1, the distance between the top plate 11 and the inner core 132 of the core plate 13, the distance between the side plate 12 and the inner core 132 of the core plate 13 and the distance between the side plate 12 and the pre-fabricated plastic block 2 are configured to be as short as possible and substantially unified. Generally, such distance could be ranged from 0.5 mm to 3.0 mm. That is, the thickness of the cavity 15 could be ranged from 0.5 mm to 3.0 mm.

Figure 2C:
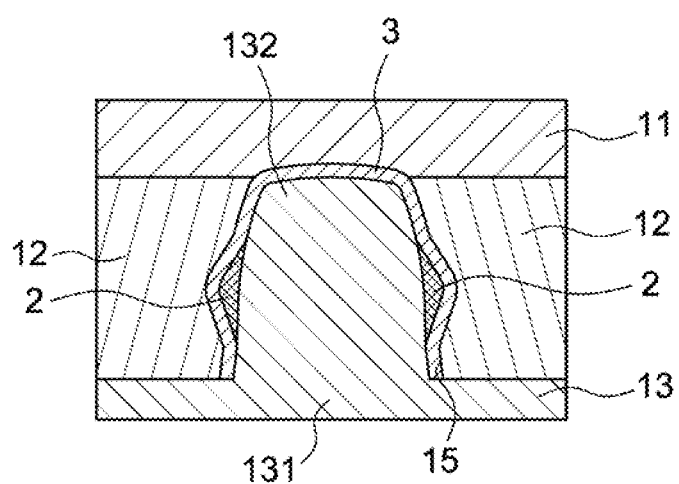

Referring to FIG. 2C, after closing the mold 1, the melted plastic 3 is injected into the cavity 15 within the mold 1. When the melted plastic 3 is filled with the cavity 15, the pre-fabricated plastic blocks 2 are encased by the melted plastic 3. After the melted plastic 3 is filled with the cavity 15, the melted plastic 3 is solidified to form a plastic model car body. Since the cavity 15 is thin and the thickness of the cavity 15 is substantially constant, the melted plastic 3 filled with the cavity 15 will have the substantially unified thin thickness and there is no shrinkage during the solidification of the melted plastic 3.

Figure 2D:
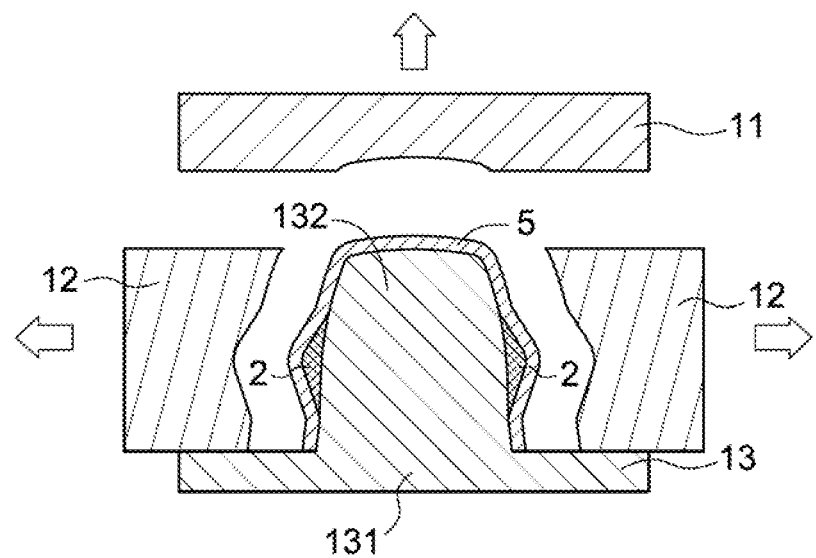

Referring to FIG. 2D, after solidification of the melted plastic 3, the plastic model car body 5 is hardened into shape and the pre-fabricated plastic blocks 2 are integrated with the plastic model car body 5 and to be parts of the plastic model car body 5. Then the top plate 11 and side plates 12 respectively move in the direction of the arrows such that the top plate 11, the side plates 12 and the core plate 13 are separated from each other and the mold 1 is opened.

Since the plastic blocks 2 are integrated with the plastic model car body 5 and to be parts of the plastic model car body 3, the portions of the model car body 5, which are integrated with the plastic blocks 2, will have a greater wall thickness than other portions of the plastic model car body 5, which are not integrated with the plastic blocks 2. That is, the plastic blocks 2 are used to create additional wall thicknesses of the plastic model car body 5 and thus the plastic model car body 5 can have different wall thicknesses at various portions.

Moreover, the plastic blocks 5 integrated with the inner surface of the plastic model car body 5 will also form the "draft angles" at the interior of the plastic model car body such that the plastic model car body 5 could be easily released from the inner core 132 of the core plate 13.

Figure 2E:
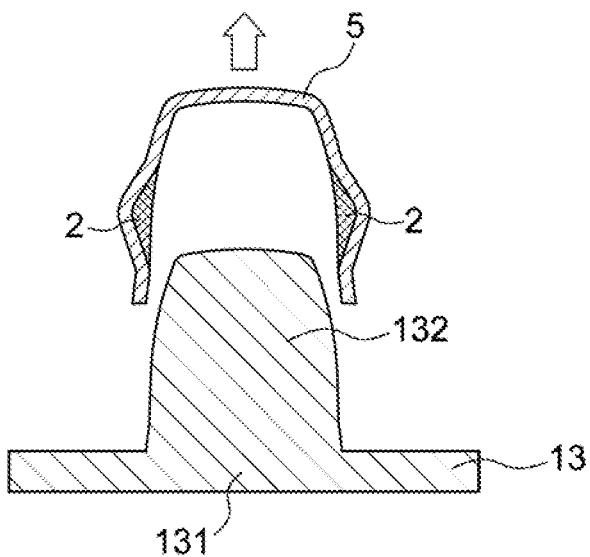

Referring to FIG. 2E, after opening the mold 1, the plastic model car body 5 is released from the inner core 132 of the core plate 13.

Figure 3:
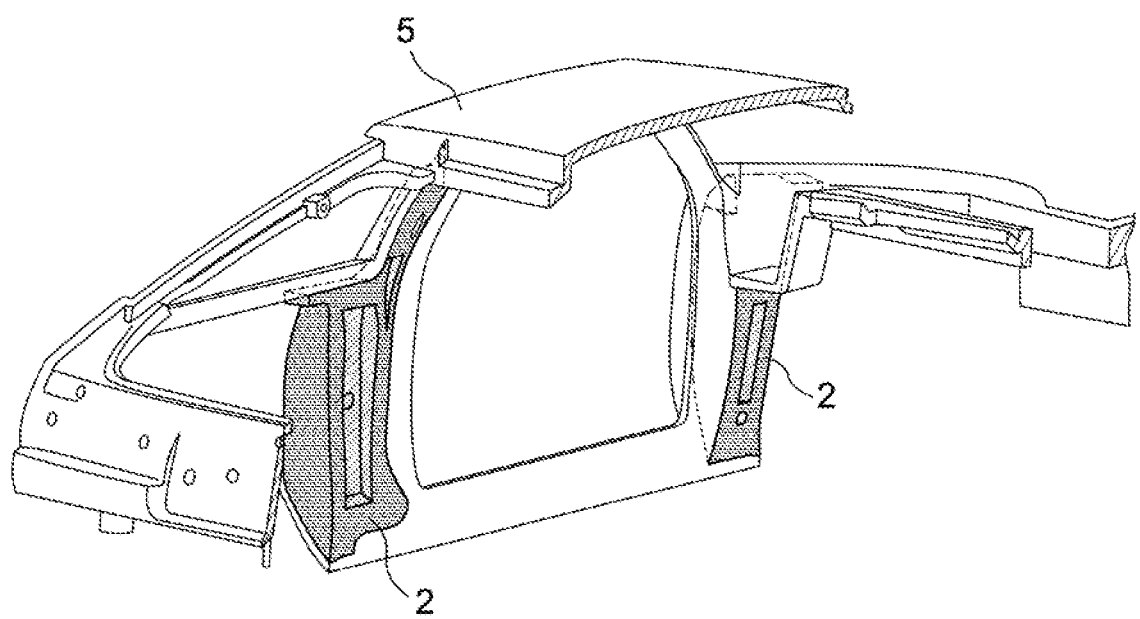
FIG. 3 is a schematic view showing a plastic model car body in accordance with an embodiment of the disclosed invention.

FIG. 3 shows a plastic model car body 5 in accordance with an embodiment of the disclosed invention. As shown in FIG. 3, the plastic blocks 2 are integrated with the inner surface of the plastic model car body 5 and they are positioned at the frame of the door opening of the plastic model car 5. Generally, the wall thickness of the plastic model car body 5 is reduced as much as possible. The wall thickness of the plastic model car body 5 could be ranged from 0.5 mm to 3.0 mm. The plastic blocks 5 is used to create the additional wall thicknesses on the inner surface of the plastic model car body 3 such that the plastic model car body 3 has greater wall thicknesses at the portions integrated with the plastic blocks 2. Referring to FIG. 3, the plastic model car body 3 has greater wall thicknesses at the frame of the door opening.

In addition, if the model car body 5 has any specific area which requires excessive wall thickness, the plastic block 2 could be positioned at such area, such as inner side of front and rear bumpers, or underneath the roof panel.

As abovementioned, the increased wall thickness of the plastic model car body 5 is created by insertion of the pre-fabricated plastic block 2 rather than the solidification of the melted plastic 3. The portion of the plastic model car body 5 with the greater wall thickness will not be shrunk when the melted plastic 3 is solidified. Thus, the whole outer surface of the plastic model car body 5 could be kept smooth after the plastic model car body 5 hardened into shape.

However, the above embodiments merely describe the principle and effects of the present disclosure instead of being used to limit the present disclosure. Therefore, persons skilled in the art can make modifications and variations to the above embodiments without departing from the spirit of the present disclosure. The scope of the present disclosure should be defined by the appended claims.

What is claimed is:

1. A method of manufacturing a model car body comprising
   (a) preparing a steel mold comprising a core plate having (i) an inner core, (ii) a top plate and (iii) at least two side plates; wherein the inner core comprises a side surface that tapers from a bottom portion of the inner core to a top portion of the inner core, wherein the top plate and the at least two side plates are movable from a separated position spaced from the inner core to a combined position wherein the top plate and the at least two side plates are closer to the inner core than in the separated position; wherein each of the at least two side plates comprises a first portion and a second portion with the first and second portions being configured such that, in the combined position, each of the first portions is spaced from the tapered side surface of the inner core a greater distance than each of the second portions;
   (b) attaching at least one pre-fabricated plastic block to the tapered side surface of the inner core such that, in the combined position, (i) the at least one pre-fabricated plastic block is disposed in a space between the first portion of each of the at least two side plates and the tapered side surface, and (ii) the top plate, the at least two side plates, the inner core and the at least one pre-fabricated plastic block form a cavity into which melted plastic material may be injected to encase the at least one pre-fabricated plastic block, wherein the at least one pre-fabricated plastic block is configured and disposed so as partially to fill the space between the first portion of each of the at least two side plates and the tapered side surface such that a thickness of the cavity is substantially uniform;

(c) injecting melted plastic material into the cavity to fill the cavity and to encase the at least one pre-fabricated plastic block;

(d) solidifying the injected melted plastic material to form the model car body with the at least one pre-fabricated plastic block integrated therein;

(e) separating the core plate, the top plate and the at least two side plates from each other; and (f) releasing the model car body with the integrated at least one pre-fabricated plastic block from the steel mold.

2. The method according to claim 1, wherein the at least one pre-fabricated plastic block is positioned to substantially correspond to a portion of the model car where a required wall thickness is to be formed.

3. The method according to claim 1, wherein the at least one pre-fabricated plastic block is positioned to substantially correspond to a frame of a door opening of the model car body.

4. The method according to claim 1, wherein the core plate is fixed and the top plate and the at least two side plates are moveable.

5. The method according to claim 1, wherein a distance between the top plate and the inner core of the core plate, a distance between the at least two side plates and the inner core of the core plate and a distance between the at least two side plates and the at least one pre-fabricated plastic block are configured to be substantially unified when the top plate and the at least two side plates are in the combined position.

* * * * *